(12) United States Patent
Puri et al.

(10) Patent No.: US 7,192,459 B2
(45) Date of Patent: Mar. 20, 2007

(54) ADDITION OF ODORANTS TO GASES FOR LEAK DETECTION

(75) Inventors: Pushpinder Singh Puri, Emmaus, PA (US); James Gordon Hansel, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 553 days.

(21) Appl. No.: 10/321,418

(22) Filed: Dec. 16, 2002

(65) Prior Publication Data

US 2004/0115820 A1 Jun. 17, 2004

(51) Int. Cl.
- *C10J 1/28* (2006.01)
- *G01N 21/00* (2006.01)
- *G01N 31/22* (2006.01)
- *G01M 3/04* (2006.01)

(52) U.S. Cl. ............... 48/195; 422/56; 436/3; 436/32; 436/144; 73/40

(58) Field of Classification Search .......... 422/56; 436/3, 32, 144; 73/40; 48/195
See application file for complete search history.

(56) References Cited

U.S. PATENT DOCUMENTS

| | | | | |
|---|---|---|---|---|
| 3,112,189 A * | 11/1963 | Elliott | .......... | 48/195 |
| 3,169,839 A | 2/1965 | Calva | | |
| 3,578,545 A * | 5/1971 | Klass | .......... | 442/96 |
| 3,669,637 A * | 6/1972 | Klass | .......... | 48/195 |
| 3,854,894 A * | 12/1974 | Klass et al. | .......... | 48/195 |
| 4,487,613 A * | 12/1984 | Yoshida et al. | ........ | 48/197 FM |
| 5,361,527 A * | 11/1994 | Burgeson | .......... | 43/1 |
| 5,963,302 A * | 10/1999 | Wittek | .......... | 352/38 |
| 6,006,374 A * | 12/1999 | Winnett et al. | .......... | 4/525 |
| 6,063,365 A * | 5/2000 | Shefer et al. | .......... | 424/65 |
| 6,063,632 A | 5/2000 | Perkins | .......... | 436/3 |
| 6,142,162 A * | 11/2000 | Arnold | .......... | 137/3 |
| 6,288,006 B1 * | 9/2001 | Arretz | .......... | 502/216 |
| 2004/0084083 A1 * | 5/2004 | Pearson | .......... | 137/312 |

FOREIGN PATENT DOCUMENTS

| | | |
|---|---|---|
| FR | 2 613 070 A1 | 3/1987 |
| JP | 4173895 * | 6/1992 |
| JP | 2000233901 | 8/2000 |
| WO | 0011120 | 2/2000 |

OTHER PUBLICATIONS

English abstract of JP 4173895, Nemoto et al., Jun. 22, 1992.*
Proc. U.S. DOE Hydrogen Program Rev. (1996), vol. 2, pp. 569-604.
M. J. Usher (*Proc. Int. Scho. Hydrocarbon Meas.* 73rd, pp. 743-748 (1998).
I. Katuran (*Proc. Int. Sch. Hydrocarbon Meas.*, 64th, pp. 325-330 (1989).

\* cited by examiner

*Primary Examiner*—Gladys JP Corcoran
*Assistant Examiner*—Nathan A. Bowers
(74) *Attorney, Agent, or Firm*—Keith D. Gourley

(57) ABSTRACT

An apparatus for dispensing an odorant to a fluid in a vessel having an interior volume containing the fluid includes at least one odorant material and an odorant-permeable material. The at least one odorant material is disposed in the interior volume, the odorant material having at least one detectable odor. The odorant-permeable material encapsulates the odorant material.

4 Claims, 2 Drawing Sheets

ADDITION OF ODORANTS TO GASES FOR LEAK DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to fluid leak detection, and in particular to the leak detection of gases by odor generated by adding odiferous materials to the gases.

With the advent of the fuel cell technology and a drive for clean fuel, hydrogen gas is emerging as a leading candidate for the fuel of choice. In addition to the benefit of being oxidizable in an emissions free manner, hydrogen may be obtained from an abundant, renewable, resource, water.

For hydrogen to become a consumer fuel for automobile and domestic power generation, safety is paramount. Although safe handling and use of hydrogen is well understood, warnings are needed to alert against any leaks. Hydrogen sensors are commercially available but are not considered to be an absolute safeguard against leaks due to their potential for malfunctioning, changing air currents, etc. Human senses, in particular, the sense of smell, are considered to be the ultimate safeguard against leaks. Since hydrogen is an odorless gas, odorants are preferably incorporated in hydrogen for easy leak detection. A review of the codes, standards, regulations, recommendations, and certifications on the safety of gaseous fuels is addressed in a report, Proc. U.S. DOE Hydrogen Program Rev. (1996), Vol. 2, pages 569–604.

Odorization of gases for leak detection is well known in the natural gas and petroleum gas industries. For example, a paper by M. J. Usher (*Proc. Int. Scho. Hydrocarbon Meas.* $73^{rd}$, pages 743–48 (1998) reviews the history, application, compounds, and safety practices in selecting and applying odorants in the natural gas industry. Mixing small quantities of odorants with gases is a substantially universal practice in natural and petroleum gases. For example, a paper by I. Katuran (*Proc. Int. Sch. Hydrocarbon Meas.*, $64^{th}$, pages 325–30 (1989) reports on natural gas odorants, their safety and handling precautions, handling techniques, and methods of adding odorants to gases.

Nearly all of the methods for odorization of natural and petroleum gases consist of metering a certain amount of the odorant into a gas stream to a level where detection can be made by the human sense of smell. Natural gas for public gas supplies typically contains 5–10 mg of sulfur per cubic meter of gas.

In several other gas applications, particularly when gases are odorless, toxic, or are otherwise harmful, methods of leak detection using odiferous materials are also desirable. The gases included in this category are, for example, nitrogen, carbon monoxide, nitrogen trifluoride, ethylene oxide, carbon tetrafluoride and other perfluoro gases.

Several other issues also have been encountered in the odorization of the natural and petroleum gases. The key ones are (1) hydrocarbon masking the odor of the odiferous materials, (2) adsorption of the odorant on the storage vessel and pipe walls, (3) reaction of the odorants with low molecular weight mercaptans (naturally occurring in the gas), (4) condensation of the odorants in the gas storage vessel and pipes, and (5) physical scrubbing of the mercaptans from the gas with liquids (associated with the natural gas). A further odorization complexity for hydrogen fuel comes from the nature of the hydrogen flame propagation. When gases burn in air, their flames propagate upwards with greater ease than they propagate downwards. This primarily due to the natural convection of hot burnt gases in an upward direction. For petroleum gases, propane and methane, the upward and downward propagating lean limits of combustion are approximately the same. However, for hydrogen, since they differ by a factor of 2.5, the amount of odorant needed for leak detection in hydrogen could be >2.5 times that needed for methane or propane. The higher quantity of the odorant needed for hydrogen odor detection further complicates the odorization problems for hydrogen gas.

Today, approximately twenty-five different blends are used as natural gas odorants. Of these twenty-five blends, seven blends are more prevalent. Almost all of the odorant agents are sulfur compounds, e.g., mercaptans (tetrabutyl mercaptan, isopropyl mercaptan, normal propyl mercaptan, secondary butyl mercaptans, ethyl mercaptans, normal butyl mercaptan, etc.), thiophenes (tetrahydrothiophene), sulfides (dimethyl sulfide, methyl ethyl sulfide), etc.

In addition to the pungent odors of these chemicals, the chemicals used are also expected to have certain other attributes, such as low vapor pressure (high boiling point), low freezing point, low specific gravity so that they are fully dispersed in the gas, and appropriate thermal properties (e.g., they will not freeze at appropriate temperatures and will not cause over odorization in the hot weather). The general quality requirements, as specified for sulfur containing odorants in ISO/DIS 13734, are: (1) a cloud point of less than −30 degrees Celsius, (2) a boiling point of less than 130 degrees Celsius, and (3) evaporation residue of less than 0.2%.

Requirements for odorants further will likely include an odorant concentration high enough to allow detection with a fuel gas concentration of ⅕ the lean limit of combustion. These requirements exist for natural gas (SAE J 1616, NFPA 52-1992) and petroleum gas (NFPA 58-1989).

A traditional method of using odorants is to meter a predetermined amount of the odorant into the gas stream either continuously in the pipeline or on a batch basis in the storage tanks. Electronic odorant injection systems (refer Zeck, DO53017A) have been designed that inject a prescribed amount of the odorants into the gas stream proportional to its flow rate. An electronic odorant injection system has five duties that it must perform to provide a safe source of natural gas. Combined, these duties insure that enough odorant is injected to make the gas properly detectable to human beings. These duties include:

1) the ability to inject the proper amount of odorant in proportion to the flow of the natural gas;
2) to properly verify system operation;
3) to provide an alarm upon system malfunction;
4) to display information regarding system performance; and
5) to provide chronological records regarding all aspects of the system performance.

The typical full-featured electronic delivery odorant system should incorporate the following major components:

1) an injection pump;
2) an odorant meter/totalizer; and
3) a system electronic/controller.

Dispensing of the odorant may be done either in the gas tank or in the gas delivery pipes. Since the odorants may be added to the bulk gas in a tank, their concentration varies throughout the tank. The odorant concentration in the delivered gas also is dependent on the speed at which the gas is dispensed. At low dispensing speeds, odorants get adsorbed on the delivery pipe walls, resulting in a low odorant concentration in the bulk gas.

Whereas adding odorants in the bulk gas is a simple method, it requires the whole gas stream to be contaminated and reasonably large quantities of the odorants have to be used. Odorants tend to condense in high pressure and low temperature storage and phase separate from the gas, thereby causing a gradient of the odorants in the gas.

Thus, the whole process of dispensing odorants to the gas and maintaining a uniform concentration of odorant in the gas is complex and requires serious improvements.

It is, therefore, desired to have a method and system for the use of odorants in gas storage and delivery systems in which an odorant is released in the gas in such a manner that a uniform quantity of the odorant is maintained at all times.

It is further desired to have a method and system for the use of odorants in gas storage and delivery systems in which odorants are distributed in the bulk gas in such a way that it maintains an almost constant concentration of the odorant in it throughout the supply of the gas.

It is still further desired to have such a system and method which overcome the difficulties and disadvantages of the prior art to provide better and more advantageous results.

BRIEF SUMMARY OF THE INVENTION

The present invention is an apparatus and a method for dispensing an odorant to a fluid in a vessel having an interior volume containing the fluid. There are several embodiments of the apparatus and a method, as discussed below. In several of the embodiments, the fluid is a pressurized gas.

With regard to the apparatus of the present invention, a first embodiment is an apparatus for dispensing an odorant to a fluid in a vessel having an interior volume containing the fluid. The apparatus includes at least one odorant material disposed in the interior volume and an odorant-permeable material encapsulating the odorant material, which has at least one detectable odor.

There are several variations of this first embodiment of the apparatus. In one variation the odorant-permeable material is permeated by at least a portion of the odorant material, whereby an equilibrium composition and an equilibrium concentration of the odorant material are maintained in the interior volume of the vessel. In another variation, the detectable odor is detectable by a sense of smell of a living being. In yet another variation, the fluid is hydrogen.

In another variation, at least a portion of the fluid is a gas stored and/or transported in the vessel. In a variant of that variation, at least a portion of the gas is at or above an ambient pressure.

In another variation of the first embodiment of the apparatus, at least a portion of the odorant material is selected from a group consisting of mercaptans (tetrabutyl mercaptan, isopropyl mercaptan, normal propyl mercaptan, secondary butyl mercaptans, ethyl mercaptans, normal butyl mercaptan), thiophenes (tetrahydrothiophene), sulfides (dimethyl sulfide, methyl ethyl sulfide), and combinations thereof, and odorants selected from a group consisting of derivatives of acrylic acid, alkyl ethers of $C_4$–$C_7$, carboxylic acids, and combinations thereof. In yet another variation, at least a portion of the odorant-permeable material is a polymer selected from a group consisting of a rubbery polymer, a glassy polymer, and combinations thereof, the rubbery polymer being selected from a group consisting of polydimethyl siloxanes, poly phasphazenes, and combinations thereof, and the glassy polymer being selected from a group consisting of polyimides, polysulfones, polyamides, polyarylates, polyolefins, polyetherketones, polycarbonates, and combinations thereof.

Another embodiment of the apparatus is similar to the first embodiment but includes a conduit disposed in the interior volume of the vessel. The conduit is adapted to transmit a flow of the fluid from the interior volume, wherein at least a portion of the flow transmitted through the conduit picks up and transmits a portion of the odorant material.

Another embodiment is an apparatus for dispensing an odorant to a pressurized gas in a vessel having an interior volume containing the pressurized gas. The apparatus in this embodiment includes at least one odorant material disposed in the interior volume and an odorant-permeable material encapsulating the odorant material, which has at least one detectable odor detectable by a sense of smell of a living being. At least a portion of the odorant material permeates from the odorant-permeable material, whereby a desired composition and a desired concentration of the odorant material are maintained in the interior volume of the vessel.

Another embodiment is an apparatus for dispensing an odorant to a pressurized gas in a vessel having an interior volume containing the pressurized gas. In addition to at least one odorant material and an odorant-permeable material, the apparatus of this embodiment includes a conduit. The odorant material is disposed in the interior volume and the odorant-permeable material encapsulates the odorant material, which has at least one detectable odor detectable by a sense of smell of a living being. The conduit is disposed in the interior volume of the vessel, and is adapted to transmit a flow of the pressurized gas from the interior volume. At least a portion of the flow transmitted through the conduit picks up and transmits a portion of the odorant material. At least a portion of the odorant material permeates from the odorant-permeable material, whereby a desired composition and a desired concentration of the odorant material are maintained in the interior volume of the vessel.

With regard to the method of the present invention, there also are several embodiments. The first embodiment is a method for dispensing an odorant to a fluid in a vessel having an interior volume containing the fluid. The method includes multiple steps. The first step is to provide at least one odorant material disposed in the interior volume, the odorant material having at least one detectable odor. The second step is to encapsulate the odorant material in an odorant-permeable material. The third step is to permeate at least a portion of the odorant material from the odorant-permeable material, whereby a desired composition and a desired concentration of the odorant material are maintained in the interior volume of the vessel.

There are several variations of the first embodiment of the method. In one variation, the detectable odor is detectable by a sense of smell of a living being. In another variation, the fluid is hydrogen. In yet another variation, at least a portion of the odorant material is sorbed on an inert substrate. In still yet another variation, at least a portion of the fluid is a gas stored and/or transported in the vessel. In a variant of that variation, at least a portion of the gas is at or above an ambient pressure.

In another variation of the first embodiment of the method, at least a portion of the odorant material is selected from a group consisting of mercaptans (tetrabutyl mercaptan, isopropyl mercaptan, normal propyl mercaptan, secondary butyl mercaptans, ethyl mercaptans, normal butyl mercaptan), thiophenes (tetrahydrothiophene), sulfides (dimethyl sulfide, methyl ethyl sulfide), and combinations thereof, and odorants selected from a group consisting of derivatives of acrylic acid, alkyl ethers of $C_4$–$C_7$, carboxylic acids, and combinations thereof. In yet another variation, at least a portion of the odorant-permeable material is a polymer selected from a group consisting of a rubbery polymer, a glassy polymer, and combinations thereof, the rubbery polymer being selected from a group consisting of polydimethyl siloxanes, poly phasphazenes, and combinations thereof, and the glassy polymer being selected from a group consisting of polyimides, polysulfones, polyamides, polyarylates, polyolefins, polyetherketones, polycarbonates, and combinations thereof.

There also are several other embodiments of the method of the present invention. For example, another embodiment is similar to the first embodiment of the method, but includes several additional steps. The first additional step is to provide a conduit disposed in the interior volume of the vessel. The second additional step is to transmit a flow of the fluid from the interior volume through the conduit, wherein at least a portion of the flow transmitted through the conduit picks up and transmits a portion of the odorant material.

Another embodiment is a method for dispensing an odorant to a pressurized gas in a vessel having an interior volume containing the pressurized gas. The method includes multiple steps. The first step is to provide at least one odorant material disposed in the interior volume, the odorant material having at least one detectable odor detectable by a sense of smell of a living being. The second step is to encapsulate the odorant material in an odorant-permeable material. The third step is to permeate the odorant-permeable material by at least a portion of the odorant material, whereby an equilibrium composition and an equilibrium concentration of the odorant material are maintained in the interior volume of the vessel. A variation of this embodiment includes two additional steps. The first additional step is to provide a conduit disposed in the interior volume of the vessel. The second additional step is to transmit a flow of the pressurized gas from the interior volume through the conduit, wherein at least a portion of the flow transmitted through the conduit picks up and transmits a portion of the odorant material.

DETAILED DESCRIPTION OF THE INVENTION

Figure 1:
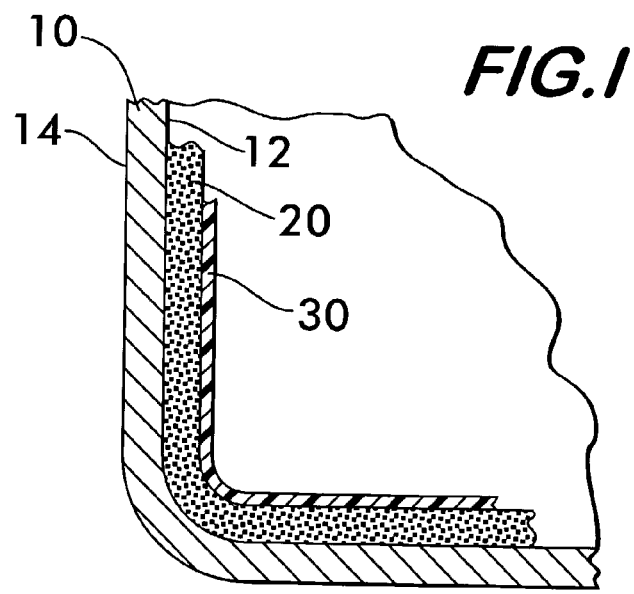
FIG. 1 is a simplified, partial, cross-sectional view of a vessel in accordance with one embodiment of the present invention.

Various systems for adding odorants to gas are provided for gas storage vessels wherein the vessel has an interior volume and inner and outer vessel surfaces. In one embodiment, an odorant layer, immobilized in a suitable carrier covers substantially all of the inner vessel surfaces and a semi-permeable or microporous material layer covers substantially all of the odorant layer, thereby substantially encapsulating the immobilized odorant material between the inner vessel wall and the semi-permeable or microporous material. The nature of the semi-permeable or microporous material is such that it permits the transportation of odorants through it while maintaining a composition and concentration of the odorant materials within the gas storage vessel which is in equilibrium with the sorbed or encapsulated odorant. The actual composition and concentration of the odorant in the gas space is dependent on the composition of the sorbed or encapsulated odorant, temperature and pressure of the storage vessel. These conditions are established in such a way that the gas in the vessel always contains a uniform and consistent concentration that is adequate to detect. Thus, the gas leaking from the vessel will have an odor detectable by the human sense of smell.

In another embodiment of the present invention, a system for alerting of the existence of diffusion and distribution of the odorant in a vessel is provided where the vessel has an interior volume and inner and outer vessel surfaces. An odorant encapsulated in discrete or continuous dimensions of the capsules containing the odorant is placed in the gas vessel. The odorant is encapsulated in the semi-permeable or the microporous material layer which covers substantially all of the odorant. The nature of the semi-permeable or microporous material is such that it permits the transportation of odorants through it while maintaining a composition and concentration of the odorant materials within the gas storage vessel which is in equilibrium with the encapsulated odorant. The actual composition and concentration of the odorant in the gas space is dependent on the composition of the encapsulated odorant, temperature and pressure of the storage vessel. These conditions are established in such a way that the gas in the vessel always contains a uniform and consistent concentration that is adequate to detect the gas leaking from the vessel to have an odor detectable by the human sense of smell.

In another embodiment of the present invention, a system for alerting of the existence of diffusion and distribution of the odorant in a vessel is provided where the vessel has an interior volume and inner and outer vessel surfaces. An additional apparatus is provided in the gas storage vessel, such as a gas cylinder, where the encapsulated or sorbed odorant is placed in the path of the discharge gas. Thus, depending on the composition and concentration of the odorant in the sorbent or capsules, temperature and pressure of the gas, the gas exiting the vessel will pick up a certain required amount of the odorant that is adequate to detect the gas leaving from the vessel to have an odor detectable by the human sense of smell.

The type and amount of the odorant can be determined on the basis of the desired composition and desired concentration in the gas leaving the vessel. For sulfur containing odorants, a desired concentration is generally about 1–10 mg S/liter or more of gas.

The odoriferous material can be added in the gas by any of the following methods.

I. Encapsulated Additives:

The odorant-encapsulated material is dispensed in the gas storage and delivery system by encapsulating it in an appropriate medium and a predetermined quantity of the encapsulated material is placed in the gas storage vessels in which the gas needs to be odorized. A key feature of the various methods described herein is that it offers a very large surface area for the gas and odorant contact, such that the condensed odorants offer a more uniform distribution of the odorant in the gas container.

The odorant encapsulated material is in any appropriate shape or form.

Figure 2:
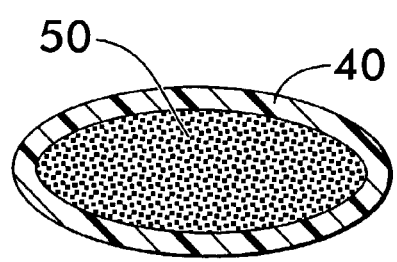
FIG. 2 is a simplified, enlarged, cross-sectional view of an encapsulated odorant capsule according to the present invention.

II. Built-In Odorant Dispenser:

A built-in odorant dispenser is the reverse operation of the built-in purifiers that are used in the gas industry to purify the gas delivered from cylinders (as shown in FIG. 2 of U.S. Pat. No. 5,409,526). Similar in design to a built-in purifier, the built-in odorant dispenser dispenses a predetermined amount of the odorant material to the gas as it exits the gas storage vessel. The odorant is sorbed (absorbed or adsorbed) on an appropriate carrier or is in the free or encapsulated state. When gas exits the pressure vessel to be dispensed to the user application, the gas carries with it a predetermined amount of the odorant, which imparts a desired level of odor to the gas sufficient for the odor to be detected by the human sense of smell. The remaining gas in the storage vessel remains free of the odorant.

A key advantage of this method is that it dispenses a uniform quantity of the odorant to the gas and eliminates the concerns associated with the non-uniformity of the odorant in the bulk gas caused by the condensation of the odorant or adsorption of the odorant on the storage vessel walls.

Referring now to the drawings, FIG. 1 shows a cross section of a wall 10 of a gas storage vessel. An odorant is encapsulated in material 20. The vessel wall 10 has an outer surface 14 and an inner surface 12. Material 20 containing odorant is placed (coated, overlaid, etc.) on the inner surface 12. An optional semi-permeable or micro-porous material 30 is placed over the encapsulated odorant in material 20. Material 30 freely permits the diffusion of odorant from material 20 without any substantial resistance.

FIG. 2 shows an individual capsule in which an odorant material 50 is encapsulated in a semi-permeable wall 40 such that the odorant is free to diffuse out of the semi-permeable wall.

Figure 3:
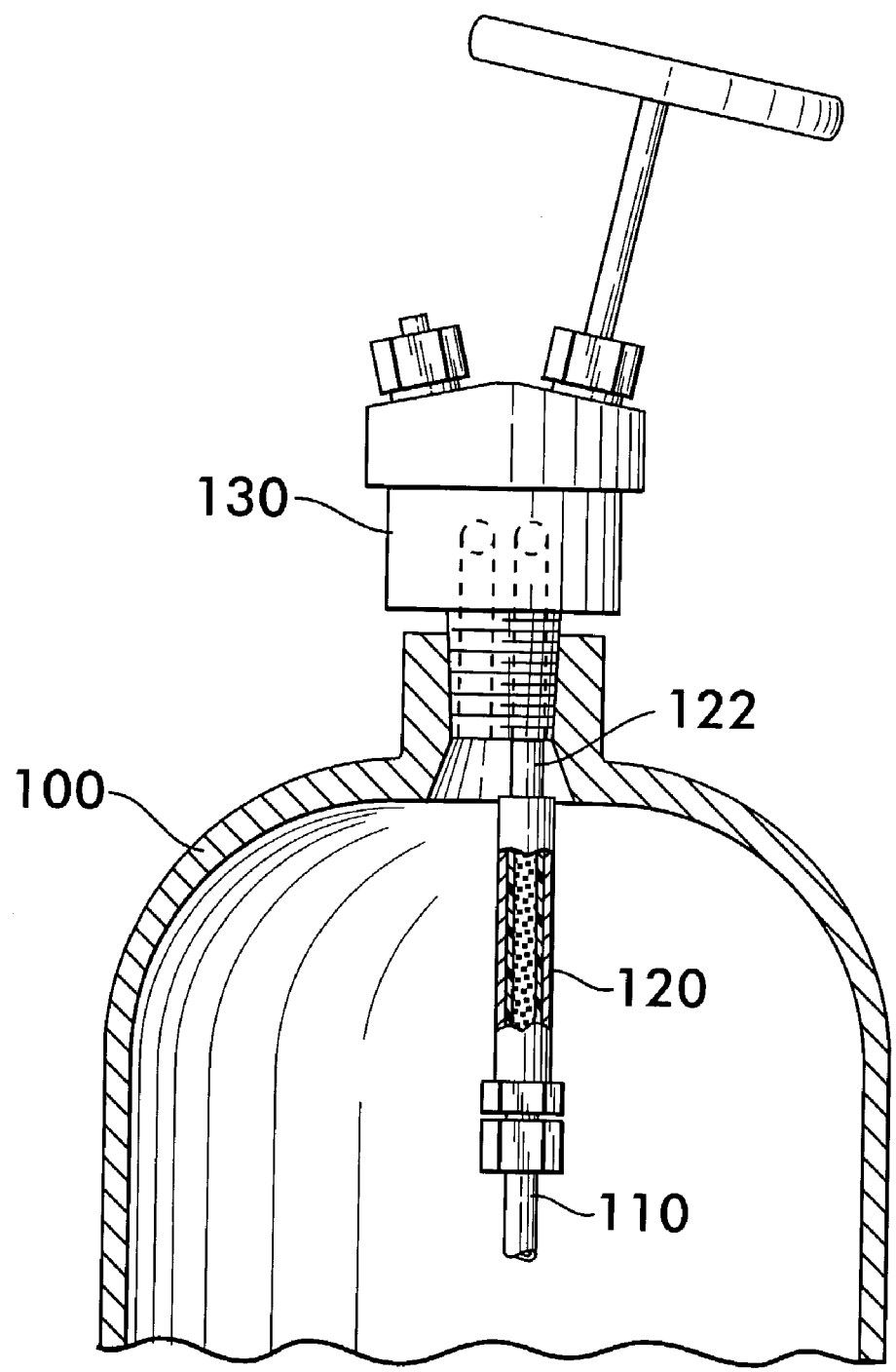
FIG. 3 is a simplified, cross-sectional view of a vessel in accordance with another embodiment of the present invention.

FIG. 3 shows a partial section of a gas-containing vessel 100, such as a gas cylinder. Within vessel 100, an open-ended tube 110 is placed in a high pressure gas space. The section 120 (of tube 110) contains an encapsulated odorant and is connected to the gas regulator 130 via connector 122.

Figure 4:
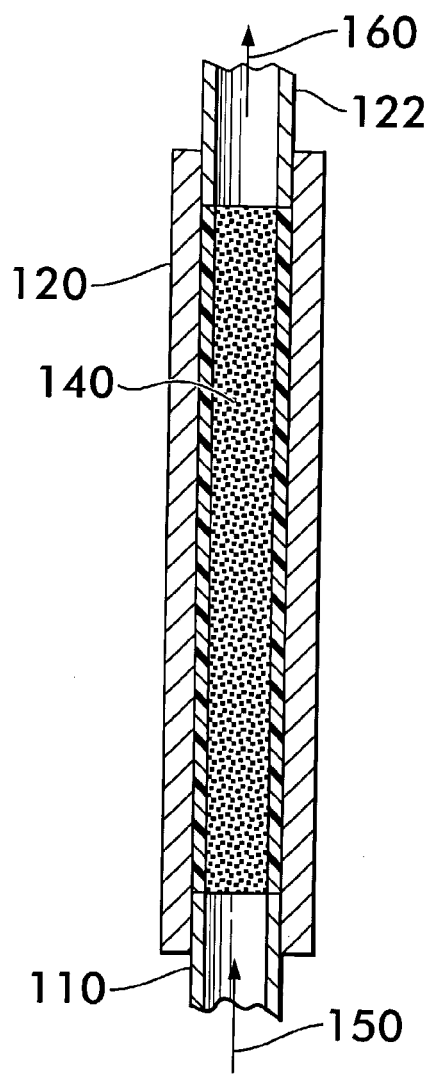
FIG. 4 is a simplified, cross-sectional view of the odorant storage area shown in FIG. 3.

FIG. 4 is an enlarged view illustrating section 120 of tube 110 showing the encapsulated odorant 140. Gas 150, which does not contain odorant, travels through section 120 and picks up the odorant from the encapsulating odorant 140, and thereby carries with it odorant for odorant containing gas 160.

EXAMPLES

Example 1

The odorant material is encapsulated in an appropriate material from which it is released and establishes an equilibrium with the gas stored in the vessel at the gas storage pressure and temperature. The encapsulation of the odorant material can be done by the known techniques in the literature. A solution of the odoriferous materials such as: mercaptans (tetrabutyl mercaptan, isopropyl mercaptan, normal propyl mercaptan, secondary butyl mercaptans, ethyl mercaptans, normal butyl mercaptan, etc.), thiophenes (tetrahydrothiophene), sulfides (dimethyl sulfide, methyl ethyl sulfide), and the like, and their combinations, and odorants selected from a group consisting of derivatives of acrylic acid, alkyl ethers of $C_4$–$C_7$, carboxylic acids, and combinations thereof, is made and applied on interior surfaces of a gas storage vessel and its accessories. The odoriferous material solution is made at a concentration of 0.01% w/w to 100% w/w either in aqueous or non aqueous relatively high volatility solvents in which the odoriferous materials are soluble. These solvents can be both polar and nonpolar solvents such that the odoriferous material solution is capable of wetting the surface of the gas vessel and its accessories and forming a continuous thin layer of liquid or semi-solid odorant on the surface. A thin film of the odorant solution is made on the various surfaces by contacting the odorant solution to the surfaces and drying out the solvents such that a continuous layer of the odorant is left on the surfaces. A single layer or multiple layers of the odorant is/are placed on the surfaces. The odorant layer is then sealed by coating over it a continuous layer of a semi-permeable or microporous polymeric or microporous non-polymeric material which has characteristics such that it permits the transport of the odorant through it. The thin encapsulating layer is formed on the odorant film, for example, using a rubbery polymer such as polydimethyl siloxane amongst other rubbery materials and glassy polymers such as polyimides, polysulfones, polyamides, polyarylates, polyolefins, polyether ketones, polytetraflouroethane, polydienes, and the like. In some cases, to block the defects in the original coating, an over coating is then made by dissolving a rubbery or glassy film forming polymer in an appropriate volatile solvent at a concentration ranging from 0.1% to 10% solution depending on the thickness, in such a way that the sealing layer does not act as a barrier to the transport of the odorant.

The art of forming polymeric semi-permeable membranes and microporous membranes is well documented in textbooks, for example, in R. E. Kesting and A. K. Fritzsche, Polymeric Gas Separation Membranes, Wiley (1983) and in R. E. Kesting, Synthetic Polymer Membranes, Wiley (1985). The art of making microporous inorganic membranes is well documented, for example, in C. J. Brinker and G. W. Scherer, *Sol-Gel Science*, Academic Press (1990). In one simple method, the coating solution is filled in the vessel and its appurtenances. The coating solution is then drained and the surfaces are dried by volatilization of the solvents, either by natural evaporation or by forced evaporation caused by heating the surfaces, using air or inert gas circulation or the combination thereof. Alternatively, the coatings can be done by a spray coating method or other methods known to those skilled in the coating art. Pre-prepared semi-permeably material layers in the form of membranes may also be placed on the odorant layer to encapsulate the odorant layer. Such semi-permeable membranes can either be commercially purchased or fabricated separately using the known art described, for example, in the references cited herein.

Example 2

The odorant material can be sorbed with an appropriate substrate where it exists in a liquid condensed form and is held there by capillary forces. The thus odorant containing sorbed material is placed in the gas storage vessel in a predetermined quantity. At the temperature and pressure of the gas, the odorant material establishes equilibrium with the gas and provides the needed concentration of the odorant material required to generate an odor in the leaking gas.

Example 3

The odorant material is immobilized by sorption or by encapsulation in a semi permeable lining which is placed or coated on the inside surfaces of gas storage vessels, piping, accessories (fittings, valves, etc.) and transfer hoses. The immobilized odorant material in the lining maintains a certain uniform concentration of the odorant in the gas depending on its properties and the storage temperature and pressure. The lining used for holding the immobilized odorant material can be of any appropriate media such as polymer, ceramic or metal.

Example 4

The lining used in Example 3 is designed in such a way that it provides surface area of contact between the gas and the odorant which is larger than the surface area on which it is formed. This is done by providing surface structure on the coatings such as ribs and fins.

Example 5

The adsorbent substrate in the vessel and accessories is a macro porous cage or spongy structure with very high surface area per unit volume and is capable of sorbing odorant material on it.

Example 6

The lining material in Example 3 does not have to fully adhere or stick to the surface of the vessel, etc.

Example 7

The encapsulation/sorption media used in Example 1 as a sorbent for the odorant material is in any appropriate geometric shape or form.

Example 8

A built in dispenser (of the design similar to that of a built in purifier) is used in a gas pressure vessel made of metal, reinforced plastic, or other structural material. The dispenser is placed in the pressure vessel in such a way that all the gas dispensed from the vessel must pass through the dispenser. The exit end of the dispenser therefore has the appropriate flow regulator valve to which a pressure/flow rate regulator can be mounted. The dispenser is made of glass, fiberglass, plastic or other structural material. The holding space in the dispenser is filled with one or more of the odorant materials or their blends used for the odorization of the gas. The barrier layer of the said dispenser therefore separates the gas in the vessel and the odorant material. In the event of dispensing gas from the pressure vessel, gas must pass through the dispenser vessel where it will come in contact with the odorant material. The odorant material carried by the gas is regulated by the selection of the characteristics of the odorant material (such as vapor pressure dispensing temperature, etc.) and the design of the dispenser (gas contacting efficiency, residence time, etc.). The dispensing gas is mixed appropriately with the odorant material at the sensing levels of the human sense of smell and hence is detectable by smell.

Example 9

A nonodorant liquid dilutes the odorant material in Example 8.

Example 10

A solid sorbent or adsorbent is used for the odorant material in the dispenser in Example 8.

Example 11

The odorant material is microencapsulated in an appropriate media and is filled in the dispenser of Example 8.

Example 12

A gas-liquid contactor is used in the built-in-dispenser as a mass transfer device between the gas and the odorant material for the transfer of the odorant to the gas when the odorant used is in the liquid state. Such a contactor is made of a gas sparger (plastic, ceramic, or metal) and/or a membrane based gas-liquid contactor.

While various embodiments of the invention have been described in detail with reference to the drawings and the specific examples above, it will be apparent to one skilled in the art that various changes and modifications can be made to those embodiments, drawings, and examples without departing from the spirit and scope of the invention as defined in the claims which follow.

The invention claimed is:

1. A method for dispensing an odorant to a fluid comprising the steps of:
    providing a vessel having an inner surface and an interior volume;
    applying a first layer comprising at least one odorant material to at least a portion of the inner surface, the odorant material having at least one odor detectable by a sense of smell of a living being, wherein the first layer comprising at least one odorant material is applied to at least a portion of the inner surface by dissolving the odorant in a solvent, placing a film of the solvent containing the dissolved odorant on the inner surface, and drying the film such that a continuous layer of odorant is left on the surface;
    applying a second layer of an odorant-permeable material over the odorant layer, thereby encapsulating the odorant material between the second layer and the inner surface of the vessel;
    filling the vessel with the fluid; and
    permeating at least a portion of the odorant material through the odorant-permeable material into the fluid, whereby a desired concentration of the odorant material is maintained in the interior volume of the vessel.

2. A method as in claim 1 wherein at least a portion of the odorant material is selected from a group consisting of isopropyl mercaptan, normal propyl mercaptan, secondary butyl mercaptans, ethyl mercaptans, normal butyl mercaptan, dimethyl sulfide, methyl ethyl sulfide, and combinations thereof, and odorants selected from a group consisting of derivatives of acrylic acid, alkyl ethers of $C_4$–$C_7$, carboxylic acids, and combinations thereof.

3. A method as in claim 1 wherein wherein at least a portion of the odorant-permeable material is a polymer selected from a group consisting of polydimethyl siloxanes, polyphosphazenes, polyimides, polysulfones, polyamides, polyarylates, polyolefins, polyetherketones, polycarbonates, and combinations thereof.

4. A method as in claim 1 wherein the fluid is hydrogen.

* * * * *